United States Patent [19]
Hartmann et al.

[11] Patent Number: 5,695,164
[45] Date of Patent: Dec. 9, 1997

[54] BRACKET

[75] Inventors: Jerome Hartmann, Carlisle; C. Austin Greider, Des Moines, both of Iowa

[73] Assignee: Mr. Bracket, Inc., Farmington, Mich.

[21] Appl. No.: 216,801

[22] Filed: Mar. 24, 1994

[51] Int. Cl.⁶ .................................................. F16B 47/00
[52] U.S. Cl. ................................. 248/316.4; 248/206.4
[58] Field of Search .............................. 248/231.41, 229.11, 248/206.3, 206.1, 228.3, 229.12, 229.22, 230.3, 316.4, 205.5–205.9, 206.2, 206.4; 269/21, 225, 227, 265, 259

[56] References Cited

U.S. PATENT DOCUMENTS

| | | | |
|---|---|---|---|
| Re. 34,120 | 11/1992 | Plahn | 248/206.3 |
| D. 313,365 | 1/1991 | Reber, II et al. | D10/121 |
| 909,469 | 1/1909 | Solberg | 269/227 X |
| 923,603 | 6/1909 | Sinning | 269/227 |
| 1,201,461 | 10/1916 | Hargrave | 269/215 |
| 1,912,287 | 5/1933 | Lundell | 248/310 |
| 2,468,294 | 4/1949 | Eppler | 269/227 X |
| 2,676,659 | 5/1954 | Emmer | 269/227 X |
| 3,009,676 | 11/1961 | Buchwald | 248/229.11 |
| 3,212,770 | 10/1965 | Stephens | 269/227 X |
| 4,197,796 | 4/1980 | Salatka | 248/206.1 |
| 4,432,525 | 2/1984 | Duvall | 248/231.41 |
| 4,648,572 | 3/1987 | Sokol | 248/206.2 |
| 4,836,482 | 6/1989 | Sokol | 248/206.3 |
| 4,896,855 | 1/1990 | Furnish | 248/206.3 |
| 5,076,090 | 12/1991 | Cetnarowski | 269/227 X |
| 5,149,032 | 9/1992 | Jones | 248/316.4 X |

*Primary Examiner*—Alvin C. Chin-Shue
*Attorney, Agent, or Firm*—Patterson & Keough, P.A.

[57] ABSTRACT

A bracket having at least two gripping members for releasably supporting, and, in turn, affixing an object to a surface. The operable distance between the gripping members may be adjusted to compensate for the width of the object. Each of the gripping members is maintained in a substantially equidistant position relative to a center region of the bracket. A movable lip member compensates for the thickness of the object and provides additional releasable securement of the object.

14 Claims, 2 Drawing Sheets

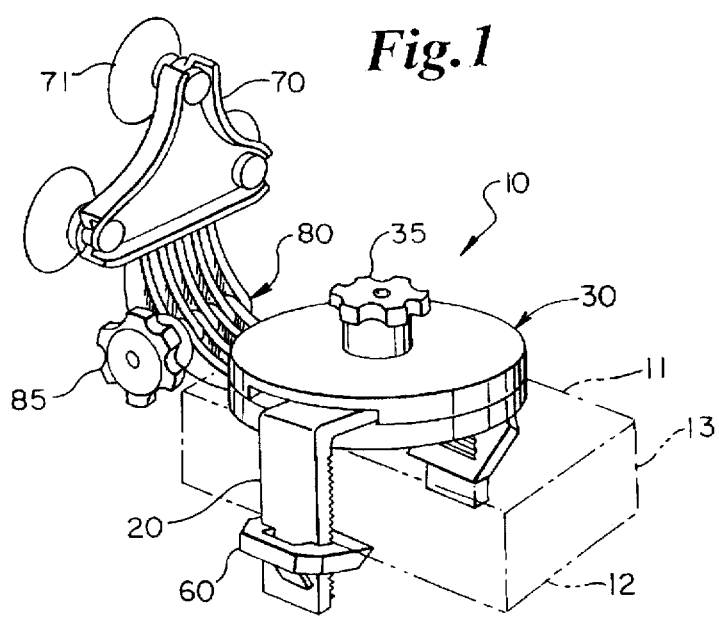
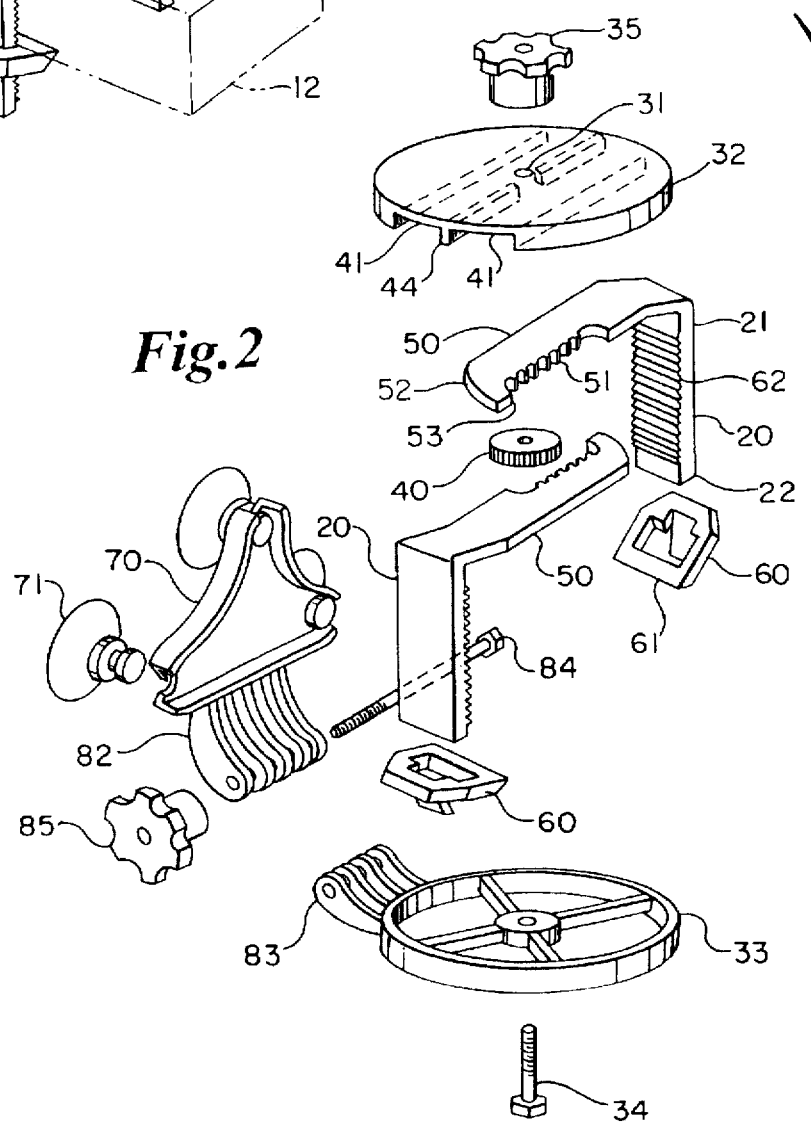

1

BRACKET

BACKGROUND OF THE INVENTION

The present invention relates to brackets, and, more particularly, to a bracket for releasably supporting and, in turn, affixing an object to a surface.

Brackets for supporting and affixing an object to a surface have been known in the art for many years. Such devices are employed, for example, to affix radar detectors to the interior surfaces of automobile windshields. Two popular forms of such brackets are custom brackets and general purpose brackets. Custom brackets are designed for affixing only an object of a predetermined size and shape to a surface. General purpose brackets are designed to accept objects of variable width and/or thickness for affixation to the surface.

One example of a prior art general purpose bracket is Plahn, U.S. Pat. Reissue No. 34,120. Prior art brackets such as that disclosed within Plahn, '120 employ a plurality of straps with adjustable positioning so as to enable the brackets to retain objects of varying width. Such prior art devices generally provide independent positional adjustment for each strap or other member used to retain the object to be held. Unfortunately, these prior art devices lack the ability to automatically maintain the object being held in a substantially concentric position with respect to a center portion of the bracket. Indeed, such prior art devices generally require individual adjustment of each of the independent straps or other members—towards an "eye-balled" centering of the object within the bracket.

The present invention overcomes the prior art's requirement of manual adjustment of multiple straps or other members to assure the centering of an object within a bracket. This short-coming of the prior art is overcome by including means for automatically centering the object to be held within the members which grip the object. These and other features of the present invention will become apparent in light of the present specification, drawings and claims.

SUMMARY OF THE INVENTION

The present invention comprises a bracket for releasably securing and affixing an object, such as a radar detector, to a surface.

The bracket includes securement means for releasably holding an object. The securement means include at least two gripping members, each of which are distally spaced apart from each other.

First support means are operably associated with the securement means for retaining the at least two gripping members in operative association with each other. Adjustment means are operably associated with the securement means and the first support means for adjusting the operable distance between each of the gripping members. Accordingly, the adjustment means serve to compensate for the width of the object to be held.

The adjustment means comprises at least two channel regions operatively associated with the first support means. Channel insertion means are attached to at least two of the gripping members for operable insertion and positioning within at least a portion of a corresponding channel region. This operable insertion and positioning of the channel insertion means within the channel region thus allows adjustment of the operable distance between the gripping members toward operable securement and release of the object.

The adjustment means further includes alignment means for operably aligning each of the gripping members with respect to a center region of the first support means. The alignment means maintains each of the gripping members in a substantially equidistant position from the center region.

In the preferred embodiment of the invention, the alignment means comprises idler means operably positioned between the channel insertion means and the gripping members. The idler means transfers substantially equal motion from one of the channel insertion means and, in turn, the corresponding gripping member, as it is being positioned to secure or release the object, to at least one other of the channel insertion means. This substantially equal transfer of motion between the channel insertion means maintains each of the corresponding gripping members in a substantially equidistant position from the center region of the first support means, and accordingly maintains the object to be held in substantially concentric alignment with the center region.

In this preferred embodiment, the idler means comprises a toothed gear. At least two of the channel insertion means have a toothed region. The toothed gear thus cooperates with the toothed regions of each of the channel insertion means to achieve the transfer of substantially equal motion to the corresponding gripping members.

Also in the preferred embodiment, the gripping members further include means for precluding the slideable extension of the channel insertion means out of the corresponding channel regions. At least one of the channel insertion means has a distal end and at least one protrusion operably positioned proximate to the distal end. The protrusion, which extends towards the idler means, substantially precludes inadvertent further rotation of the idler means upon contact of the protrusion therewith. As a result, slideable extension of the at least two channel insertion means out of the corresponding channel regions is substantially precluded.

The present bracket further includes second support means for affixing the bracket to a surface. The second support means are operatively associated with the first support means, and, may include at least one suction cup for purposes of attachment to a surface.

At least one of the gripping members includes a distal end operatively associated with the first support means, and a proximal end positioned away from the first support means. In addition, it is also contemplated that at least one of the gripping members includes means for compensating for the thickness of the object to be held. The thickness compensating means (which also serves to provide additional releasable securement of the object being held).

In the preferred embodiment of the invention, the thickness compensating means includes at least one movable lip member slideably positionable along a corresponding gripping member. Furthermore, locking means are associated with the lip member for locking the lip members at a desired position along the corresponding gripping member.

At least one of the gripping members further includes a toothed rack region and the lip member corresponding to the gripping member includes a pall. The pall of the lip member serves to cooperate with the toothed rack region of the corresponding gripping member to provide ratcheted positioning of the lip member relative to the corresponding gripping member.

The present bracket further includes pivoting means operably associated with the first support means and the second support means. The pivoting means, which, in the preferred embodiment, comprises a hinge, enables pivotal movement of the first support means relative to the second support means. In addition, position maintaining means releasably maintains a desired positioned of the first support means relative to the second support means.

BRIEF DESCRIPTION OF THE DRAWINGS

FIG. 1 of the drawings is an elevated perspective view of the present bracket, showing, in particular, the releasably held object;

FIG. 2 of the drawings is an exploded perspective view of the present bracket;

DETAILED DESCRIPTION OF THE DRAWINGS

Figure 3:
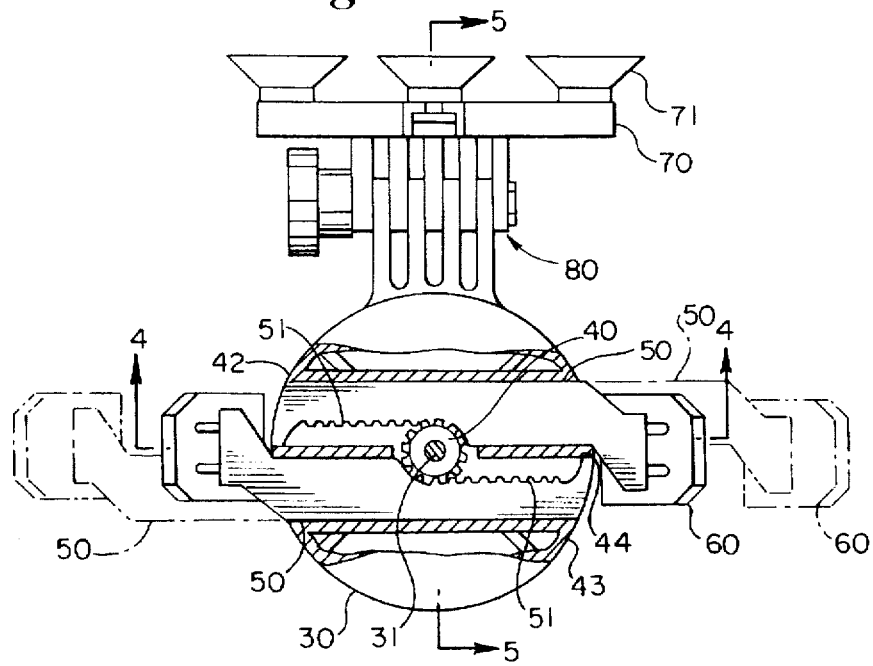
FIG. 3 of the drawings is a partially cut-away top plan view of the present bracket, showing, in particular, the gripping members in both retracted and extended positions.

While this invention is susceptible of embodiment in many different forms, there is shown in the drawings and will herein be described in detail, one specific embodiment, with the understanding that the present disclosure be considered as an exemplification of the principles of the invention and is not intended to limit the invention to the embodiment illustrated.

Bracket 10 is shown in FIG. 1 and FIG. 2 as comprising gripping member 20, first support means 30, adjustment means 40 (FIG. 2), two channel insertion means 50 (FIG. 2), second support means 70, and thickness compensating means (FIG. 2 and FIG. 9)—which includes lip member 60. In addition, first support means 30 includes two channel regions 41 (FIG. 2) for accepting corresponding ones of channel insertion means 50.

As can be seen in FIG. 1, bracket 10, and more particularly first support means 30, is used to releasably support and hold an object, such as a radar detector housing, therewithin. Second support means 70, which includes suction cups 71 (FIGS. 1–5), on the other hand, is shown in detail in FIG. 2 and FIG. 3 as being pivotally attached to first support means 30 by pivoting means (which includes hinge 80). The second support means serves to physically secure bracket 10 to a surface, such as an automobile windshield, at a device orientation relative to first support means 30. Furthermore, once such a device orientation is obtained, the position between first and second support means 30, 70, respectively, is operably secured by position maintaining means (which includes bolt 84 and nut 85), as shown in FIG. 2.

Figure 4:
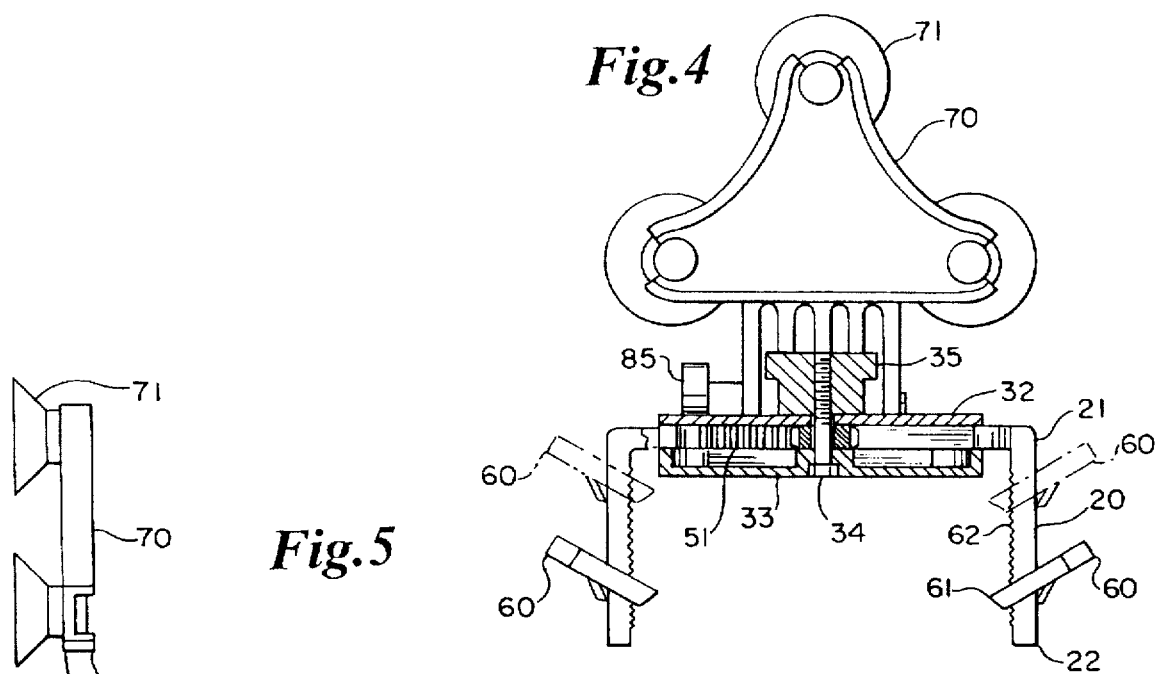
FIG. 4 of the drawings is a cross-sectional front elevational view of the present bracket, taken generally along lines 4—4 of FIG. 3, showing, in particular, the ratcheted positioning of the lip members.

First support means 30 is shown in detail in FIG. 2 and FIG. 4 as including first disc-like member 32 and second disc-like member 33. First disc-like member 32 includes first wall member 42, second wall member 43, and center wall member 44 which collectively define channel regions 41.

Channel insertion means 50 (FIG. 2 and FIG. 4) are integrally attached to corresponding gripping members 20. Each channel insertion means includes a distal end 52, positioned away from gripping member 20, and a toothed region 51. As will be explained, each of the channel insertion means are slideably positioned within a corresponding channel region 41 of first support means 30 for purposes of positioning the object to be held by the gripping member 20 in a substantially concentric orientation relative to center region 31 (FIG. 3) of first support means 30.

Figure 5:
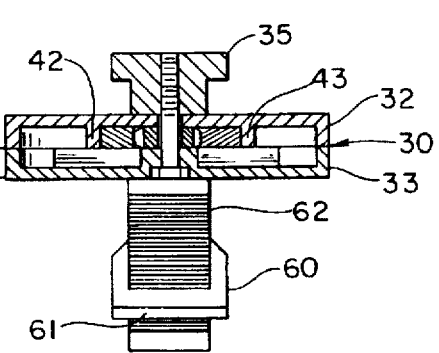
FIG. 5 of the drawings is a cross-sectional side elevational view of the present bracket, taken generally along lines 5—5 of FIG. 3.

As can be seen in FIG. 5, bolt 34 is positioned through holes proximate to center region 31 within second disc-like member 33, idler means comprising gear 40, and first disc-like member 32. Nut 35 retains bolt 34 in this position. Accordingly, bolt 34 provides an axis for gear 40 to spin about, maintains the position of gear 40 proximate to center region 31, and maintains operable contact between first disc-like member 32 and second disc-like member 33.

As can be seen in FIG. 3, toothed region 51 of each channel insertion means 50 is slideably positioned proximate to a portion of center wall member 44 of first support means 30, so as to enable operable cooperation with toothed gear 40. It should be noted that toothed gear 40 not only functions as part of the means for adjusting the position of gripping member 20, but also serves as part of the alignment means for adjusting both of the gripping members at a substantially equidistant orientation relative to center region 31.

In operation, either of the channel insertion means 50 may be slideably extended away from center region 31 of first support means 30 by pulling the attached gripping member 20 away from first support means 30. As shown in FIG. 3, this slideable extention of one channel insertion means 50, and, in turn, the corresponding lateral movement of the associated toothed region 51, imparts a clockwise rotation of toothed gear 40, (as viewed from above bracket 10). This imparts lateral movement of the toothed region 51 of the other channel insertion means 50, and, in turn, transfers substantially equal motion from one channel insertion means 50 to the other. Accordingly, as one channel insertion means 50 is extended within its associated channel region 41, the other channel insertion means is likewise extended a substantially equal distance within its corresponding channel region—thereby maintaining each of the gripping members associated with the channel insertion means in a substantially equidistant position from center region 31 of first support means 30. Since object 11 is held between gripping members 20, object 11 is thus maintained, and positionable in a substantially concentric alignment with respect to center region 31—without independent adjustment of each of the gripping members.

Similarly, either of the channel insertion means 50 may also be slideably retracted towards center region 31 of first support means 30 by pushing a corresponding one of an attached gripping member 20 towards first support means 30. This slideable retraction of one channel insertion means 50 imparts a counterclockwise rotation of toothed gear 40, (as viewed from above bracket 10), which in turn, imparts lateral movement of the other channel insertion means 50. Accordingly, as one channel insertion means 50 is retracted within its associated channel region 41, the other channel insertion means is likewise retracted a substantially equal distance within its corresponding channel region.

Channel insertion means 50 further includes protrusion 53 proximate to distal end 52 of the channel insertion means. Protrusion 53 is substantially adjacent to toothed region 51, and extends inwardly towards center wall member 44 and center region 31. As one of the channel insertion means 50 is extended a predetermined distance from first support means 30, protrusion 53 comes into contact with gear 40. This contact between protrusion 53 and gear 40 precludes any further slideable extention of the associated channel insertion means, preventing removal of the channel insertion means from the associated channel region 41.

Bracket 10 further includes means for compensating for the thickness of the object 11 being held. Indeed, gripping member 20 includes a distal end 21 positioned near first support means 30, and a proximal end 22 positioned away from first support means 30. Gripping member 20 further includes a toothed rack region 62, positioned between distal end 21 and proximal end 22.

Movable lip member 60, which, includes pawl region 61, is slideably positionable along gripping member 20. As lip member 60 is slideably positioned along gripping member 20, rack region 62 and pawl region 61 cooperate to provide ratcheted positioning of lip member 60 to, in turn, alternatively lock lip member 60 at a desired position along gripping member 20. This slideable positioning and locking of lip member 60 serves to releaseably maintain lip member 60 in an enhanced secured position relative to the thickness of object 11.

The foregoing description and drawings merely explain and illustrate the invention and the invention is not limited thereto except insofar as the appended claims are so limited, as those skilled in the art who have the disclosure before them will be able to make modifications and variations therein without departing from the scope of the invention.

What is claimed is:

1. A bracket for holding a depending object having a width and a thickness comprising:

a first support member having a center region;

at least two gripping members associated with the first support member, the at least two gripping members each including a toothed rack and a toothed region;

at least one movable lip member operably associated with each of the gripping members, each movable lip member including a pawl engaging the toothed rack of the operatively associated gripping member, to provide for racheted positioning;

an adjustment member associated with the toothed regions of each of the at least two gripping members and the first support member, the adjustment member capable of adjusting the distance between the gripping members simultaneously and uniformly toward or away from the center region, to in turn, maintain the gripping members equidistant from the center region; and a second support member associated with the first support member for affixing the bracket to an outside surface.

2. The bracket according to claim 1 wherein the adjustment member comprises a toothed gear matingly engaged with the toothed region of each of the gripping members for transferring substantially equal motion to the gripping members to maintain each of the gripping members in a substantially equidistant position from the center region of the first support member and, in turn, to maintain the object in substantially concentric alignment with the center region.

3. The bracket according to claim 1 wherein the gripping members each further include a protrusion member associated with each toothed region precluding slidable extension of each toothed region out of operable engagement with the adjustment member.

4. The bracket according to claim 1 further including a hinge associated with the first support member and the second support member to enable pivotal movement there between.

5. The bracket according to claim 1 wherein the hinge further includes position maintaining means for maintaining a desired position of the first support member relative to the second support member.

6. The invention according to claim 1 wherein the second support member includes at least one suction cup.

7. The bracket according to claim 1 wherein:

each gripping member has two opposed surfaces;

the toothed rack of each gripping member is on one of the two opposed surfaces; and each movable lip member includes a biasing member that engages the surface of the gripping member opposite to the toothed rack for automatically retaining the pawl member in lockable engagement with the toothed rack.

8. The bracket according to claim 7 wherein the biasing member is integrally molded with the movable lip member.

9. The bracket according to claim 1 wherein the adjustment member includes a cover over the adjustment member, at least a portion of the toothed region of the gripping members, and at least a portion of the first support member; the gripping members include opposed surfaces including an inner surface and an outer surface; and the toothed rack is positioned on at least a portion of the inner surface of each of the at least two gripping members providing a smooth outward surface substantially free of sharp edges and protrusions.

10. The bracket according to claim 1 further including a locking member for releasably locking the gripping members and precluding inward and/or outward movement relative to the first support member.

11. The bracket according to claim 1 wherein the at least two gripping members are capable of rotatable movement relative to the first support member about the adjustment member.

12. The bracket according to claim 11 further including a locking member for releasably locking the gripping members and precluding inward and/or outward movement relative to the first support member.

13. The bracket according to claim 12 wherein the locking member precludes rotatable movement of the gripping members relative to the first support member.

14. The bracket according to claim 1 wherein each of the gripping members include two portions disposed at substantially right angles to each other with one of the two portions including the toothed rack and the other of the two portions including the toothed region.

* * * * *